(12) United States Patent
Cranen

(10) Patent No.: US 10,512,350 B1
(45) Date of Patent: Dec. 24, 2019

(54) FASTENER SYSTEMS FOR SECURING AGRICULTURAL MATS

(71) Applicant: Rochus de Ruijter Waalwijk B.V., Waalwijk (NL)

(72) Inventor: Niels Cranen, Coldwater, OH (US)

(73) Assignee: Rochus de Ruijter Waalwijk B.V., Waalwijk (NL)

( * ) Notice: Subject to any disclaimer, the term of this patent is extended or adjusted under 35 U.S.C. 154(b) by 0 days.

(21) Appl. No.: 16/056,005

(22) Filed: Aug. 6, 2018

(51) Int. Cl.
| | |
|---|---|
| *A47G 27/04* | (2006.01) |
| *A01K 1/015* | (2006.01) |
| *A01K 1/01* | (2006.01) |
| *B60N 3/04* | (2006.01) |

(52) U.S. Cl.
CPC ........ *A47G 27/0418* (2013.01); *A01K 1/0157* (2013.01); *A01K 1/0103* (2013.01); *A01K 1/0151* (2013.01); *B60N 3/046* (2013.01); *Y10T 16/10* (2015.01)

(58) Field of Classification Search
CPC ...................... A47G 27/0418; A47G 27/0425; Y10T 16/10; Y10T 16/118; A01K 1/0157; A01K 1/0151; A01K 1/0103; B60N 3/046
USPC .......................................................... 16/4, 8
See application file for complete search history.

(56) References Cited

U.S. PATENT DOCUMENTS

| | | | | |
|---|---|---|---|---|
| 4,067,155 | A * | 1/1978 | Ruff | ...................... E04B 1/6803 |
| | | | | 4/498 |
| 5,192,599 | A * | 3/1993 | Sakamoto | .......... A47G 27/0418 |
| | | | | 16/16 |
| 8,757,698 | B1 * | 6/2014 | Rowland | ................ B60N 3/046 |
| | | | | 296/97.23 |
| 2005/0239320 | A1 * | 10/2005 | Folkema | .............. A01K 1/0157 |
| | | | | 439/404 |

\* cited by examiner

*Primary Examiner* — Jeffrey O'Brien
(74) *Attorney, Agent, or Firm* — Dorton & Willis, LLP

(57) ABSTRACT

A fastener for securing livestock mats to a foundation having at least one recess includes a body formed from fiber-reinforced polymer material. The body has a shank with a first, terminal end and an oppositely disposed second end. The shank may be sized and shaped to be received into the recess in the foundation. A head at the second end of the shank includes an outer peripheral edge extending radially outwardly from the shank relative to a longitudinal axis of the shank. The shank further includes oppositely disposed first and second sides and a foundation engaging surface on at least a portion of at least one of the first or second sides. The foundation engaging surface is contoured to frictionally engage the foundation when the shank is received therein.

11 Claims, 6 Drawing Sheets

FASTENER SYSTEMS FOR SECURING AGRICULTURAL MATS

TECHNICAL FIELD

The present invention relates generally to floor support structures for livestock and, more particularly, to a fastener system for securing livestock mats.

BACKGROUND

Agricultural mats for supporting livestock have been used in barns, confinement pens, livestock buildings, or other containment areas to provide a durable, resilient surface that facilitates maintaining or improving the health and safety of livestock such as cows, horses, pigs, or other animals standing or walking upon the mats. A plurality of mats are typically disposed over a foundation, usually configured as a slat-type floor structure comprising pre-fabricated concrete panels. The panels have regularly spaced slots or openings to facilitate the wash-down and removal of solid and liquid wastes from the area where the mats are used. To help alleviate stress on the joints of livestock caused by standing on such hard concrete surfaces, and to improve traction in wet conditions such as when livestock areas are washed down to remove waste, agricultural mats formed from rubber or other resilient materials have been applied atop the concrete panels.

Conventional methods of securing livestock mats against inadvertent movement include directly bonding mats to the panels or the use of metal components such as screws, bolts, or brackets to secure the mats to the concrete panels. These previous fastening systems have various drawbacks. For example, direct bonding of mats to the concrete panels results in the mats being difficult to remove when replacement or repair is needed. Conventional fasteners are generally tedious to install, and the metal components may pose a hazard to livestock, particularly if the fasteners become loosened or separated from the mats. Because livestock such as cows may weigh up to about 1400 pounds, the fasteners and mats must be able to withstand the heavy loads of livestock traversing the mats. A need exists for an improved fastening system for securing livestock mats that that is durable and that overcomes these and other drawbacks of prior fastening systems.

SUMMARY

The present invention provides a fastener system for securing agricultural mats to a foundation such as pre-fabricated concrete panels having a plurality of openings or recesses that facilitate removal of waste materials. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, a fastener for securing livestock mats to a foundation having at least one recess includes a body formed from fiber-reinforced polymer material. The body has a shank with a first, terminal end and an oppositely disposed second end. The shank may be sized and shaped to be received into the recess in the foundation. A head at the second end of the shank includes an outer peripheral edge extending radially outwardly from the shank relative to a longitudinal axis of the shank. The shank further includes oppositely disposed first and second sides and a foundation engaging surface on at least a portion of at least one of the first or second sides. The foundation engaging surface is contoured to frictionally engage the foundation when the shank is received therein.

In one embodiment, the shank may further include oppositely disposed third and fourth sides disposed between the first and second sides. At least a portion of one of the third or fourth sides of the shank may define a planar surface. In another embodiment, both the first and second sides include foundation engaging surfaces. In another embodiment, the contours of the foundation engaging surfaces define at least one ridge positioned to operatively engage the foundation.

In another aspect, a mat assembly for supporting livestock includes a generally planar mat configured to support livestock thereon and at least one fastener sized to be received though at least one aperture through the mat and adapted to secure the mat to a foundation. In another aspect, a method for securing a livestock mat to a foundation includes positioning the livestock mat on the foundation, aligning an aperture through the mat with a recess defined in the foundation, and inserting a fastener as described herein through the aperture and into the recess, whereby the fastener frictionally engages the recess such that the livestock mat is secured to the foundation.

The above and other objects and advantages of the present invention shall be made apparent from the accompanying drawings and the description thereof.

DETAILED DESCRIPTION

Figure 1:
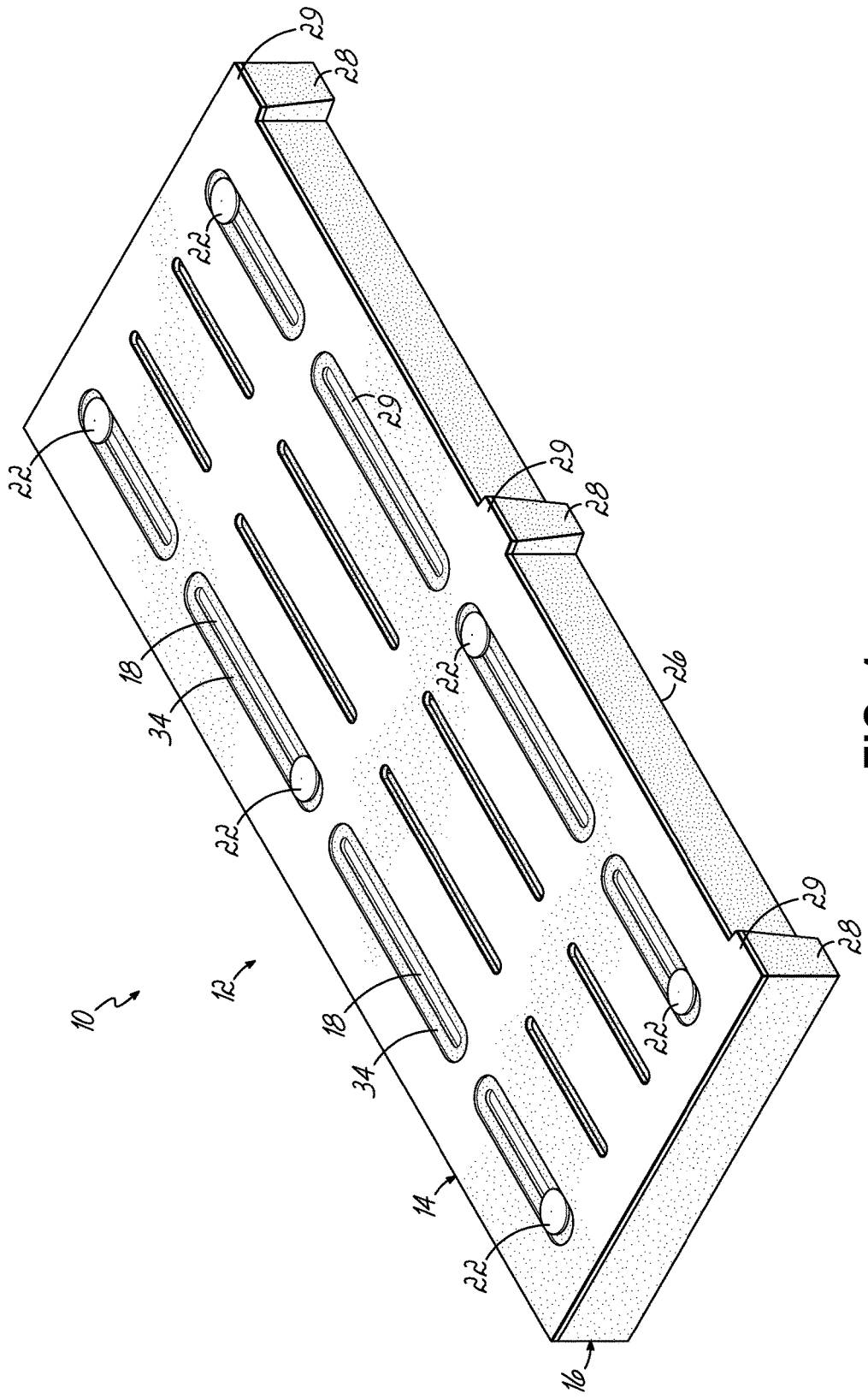
FIG. 1 is a top perspective view of an exemplary support structure for livestock, including a livestock mat assembly in accordance with the principles of the present disclosure.
Figure 2:
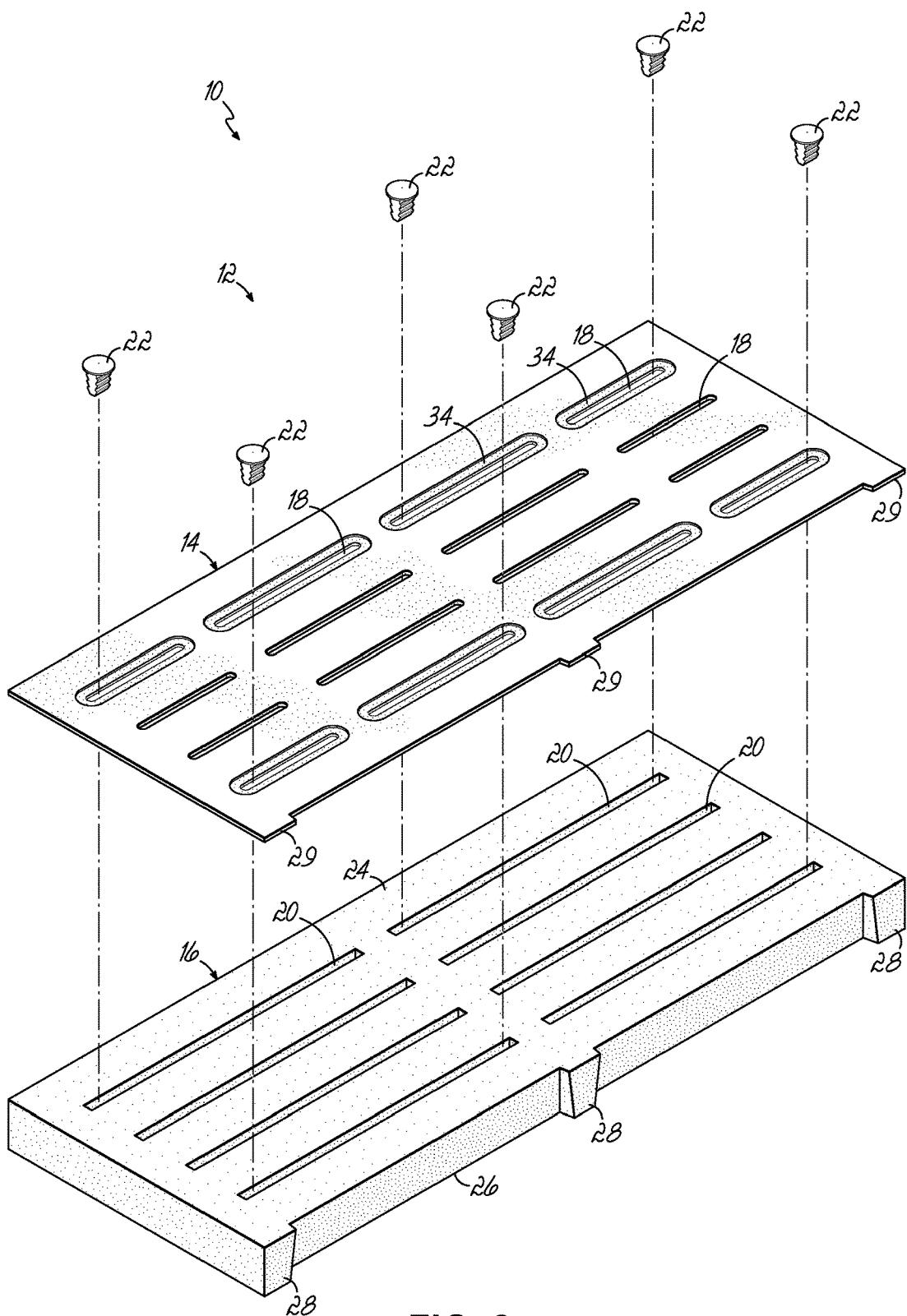
FIG. 2 is an exploded view of the support structure of FIG. 1.
Figure 3:
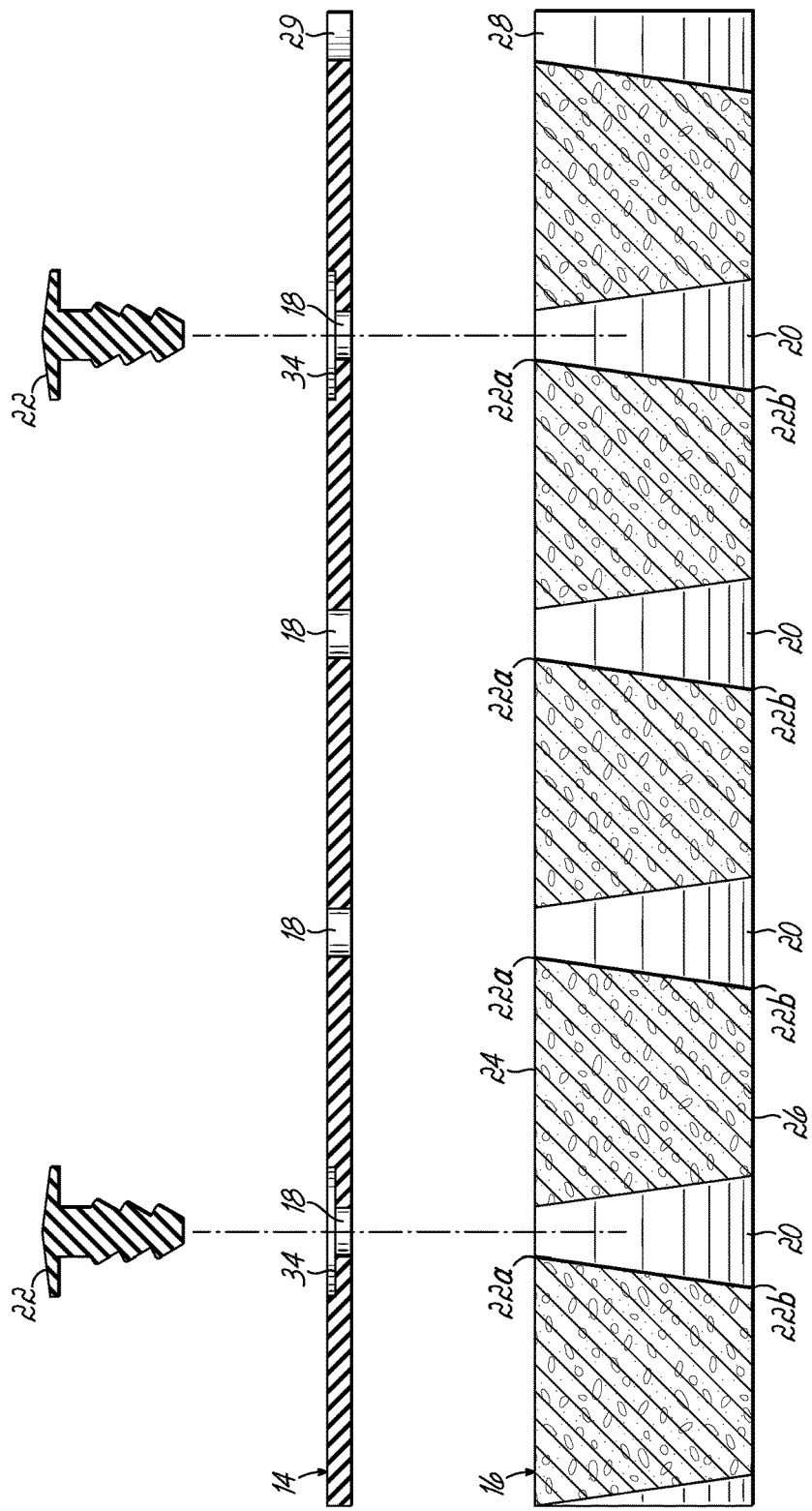
FIG. 3 is a cross-sectional view of the support structure of FIG. 2, taken along line 3-3.

FIG. 1 depicts a support structure 10 for livestock including a livestock mat assembly 12 in accordance with the principles of the present disclosure. The mat assembly 12 includes a livestock mat 14 disposed atop a foundation in the form of a concrete panel 16. While a single panel 16 and mat 14 are depicted in FIGS. 1 and 2, the support structure 10 of a typical installation generally comprises a plurality of concrete panels 16 positioned adjacent one another to define a slat-type floor structure over which a corresponding plurality of mats 14 are disposed. With continued reference to FIG. 1, and referring further to FIGS. 2-5, the livestock mat 14 includes a plurality of spaced apart apertures 18 through the mat 14 and generally corresponding with openings or recesses 20 in the concrete panel 16 such that the apertures 18 in the mat 14 align with the recesses 20 in the panel 16 when the livestock mat 14 is positioned atop the panel 16. The recesses 20 in the concrete panel 16 may extend completely through the panel 16, or may communicate with a channel (not shown) to facilitate the removal of solid and liquid waste material. In the embodiment shown herein, the recesses 20 extend completely through panel 16 and have a tapered configuration that gradually widens from a first end 22a proximate an upper side 24 of panel 16, to a second end 22b proximate a bottom side 26 of panel 16. The panels 16 may further include one or more projections 28 disposed on a laterally facing side of the panel 16 to facilitate spacing adjacent panels 16. Livestock mats 14 may include corresponding projections 29 complimentary to the projections 28 on panels 16.

The livestock mat 14 is secured in position atop the concrete panel 16 by one or more fasteners 22. To secure the livestock mat 14 in place, a livestock mat 14 is positioned on a corresponding concrete panel 16 of the foundation, and one or more apertures 18 through the mat 14 are aligned with corresponding recesses 20 defined in the concrete panel 16. A fastener 22 is then inserted through the aperture 18 in the mat 14 and into the recess 20. The fastener 22 is configured such that a shank portion 30 of the fastener 22 frictionally engages at least one of the livestock mat 14 or the recess 20 formed in the panel 16 to thereby secure the mat 14 against movement. The dimensional relationships between the shank 30 of the fastener 22, the aperture 18 through the mat 14, and the recess 20 in the concrete panel 16 are selected such that the fastener 22 tightly fits within the recess 20 of the concrete panel 16 and generally requires the application of force to a head 32 of the fastener 22 to fully seat the shank 30 of the fastener 22 within the recess 20. The agricultural mat 14 may further include countersink areas surrounding the respective apertures through the mat, or at least proximate selected areas where fasteners are intended to be installed, so that the head 32 of the fastener 22 extends only minimally above the upper surface of the mat 14 in the installed configuration.

Figure 6:
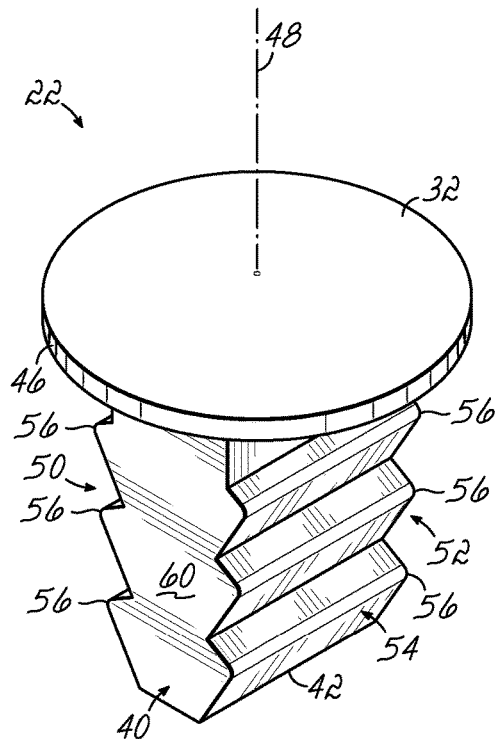
FIG. 6 is a front, left perspective view of an exemplary fastener in accordance with the principles of the present disclosure.
Figure 7:
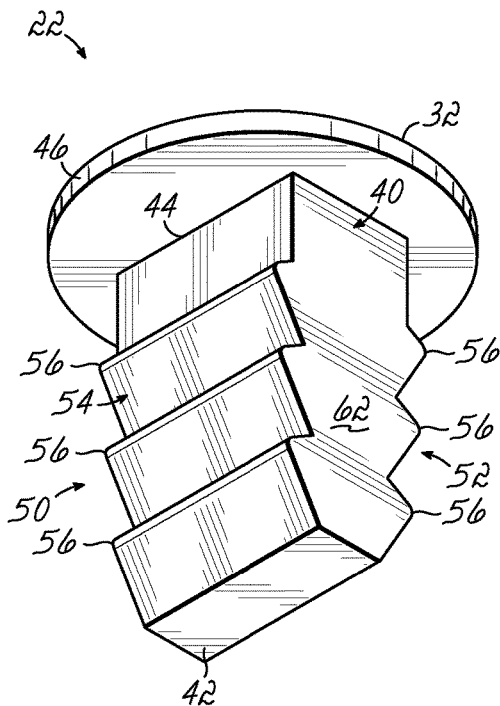
FIG. 7 is a rear, left perspective view of the fastener of FIG. 6.
Figure 8:
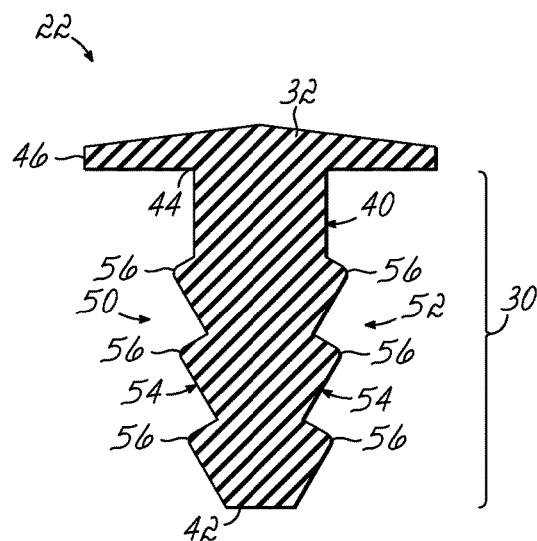
FIG. 8 is a cross-sectional view of the fastener of FIG. 7, taken along line 8-8.

FIGS. 6-8 illustrate an exemplary fastener 22 in accordance with the present disclosure in more detail. In the embodiment shown, the faster 22 comprises a fastener body 40 including a shank 30 having a first, terminal end 42 and a second end 44 oppositely disposed from the first end 42. The head 32 of the fastener 22 is disposed at the second end 44 and includes an outer peripheral edge 46 extending radially outwardly from the shank 30 relative to a longitudinal axis 48 of the shank 30. In the embodiment shown, the shank 30 includes oppositely disposed first and second sides 50, 52. A foundation engaging surface 54 is disposed on at least a portion of one of the first or second sides 50, 52 of the shank 30. In the embodiment shown, foundation engaging surfaces 54 are provided on both the first and second sides 50, 52.

Figure 4:
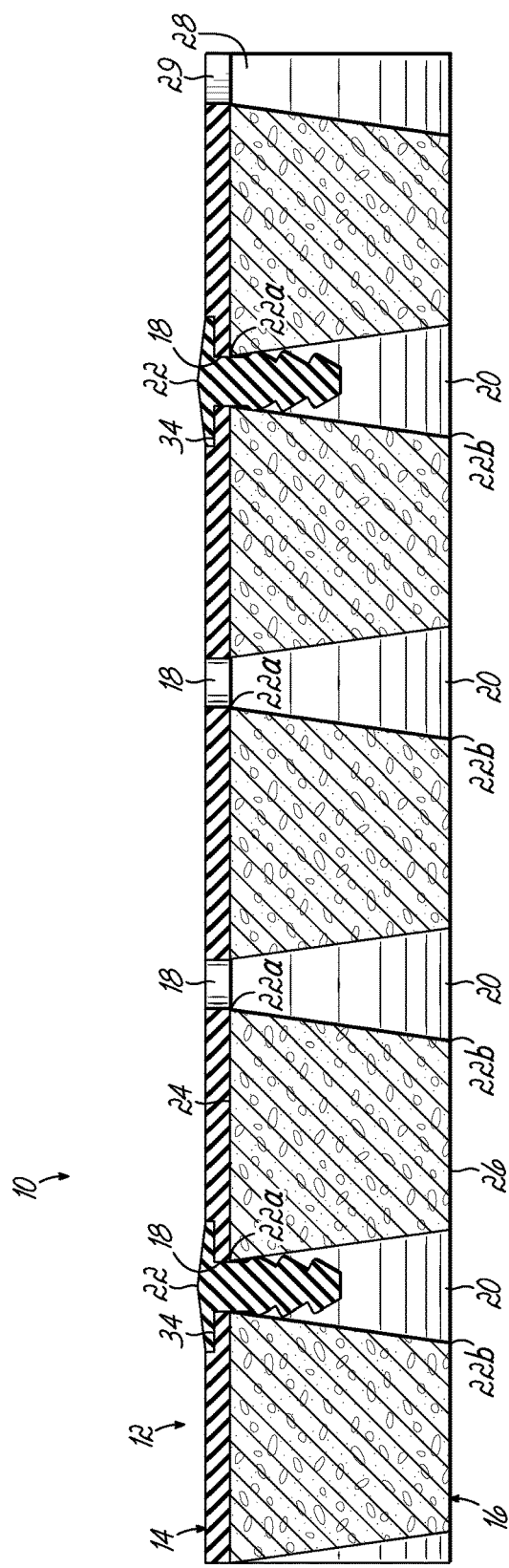
FIG. 4 is a cross-sectional view similar to FIG. 3, depicting the support structure with the mat and fasteners in an installed configuration.
Figure 5:
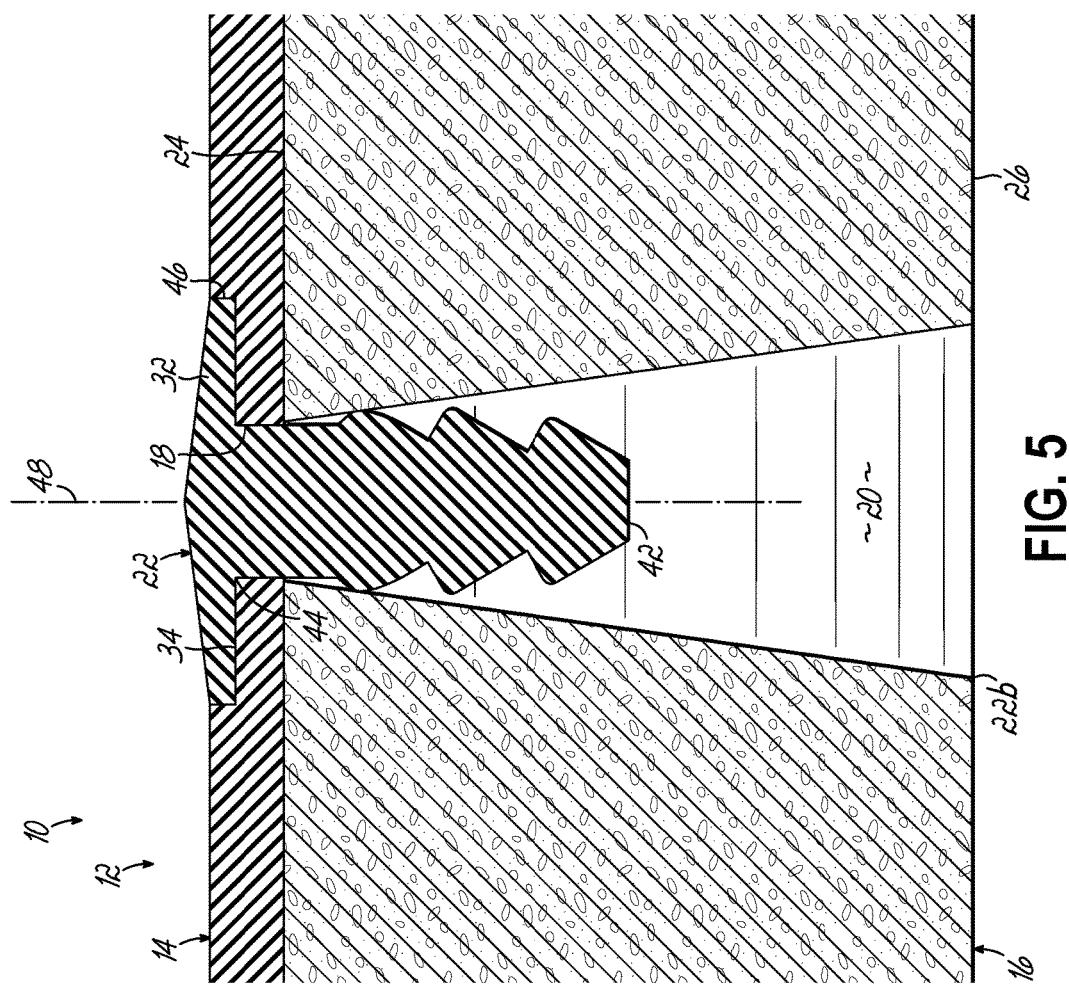
FIG. 5 is an enlarged detail view of the support structure of FIG. 4 in the vicinity of a fastener.

The foundation engaging surfaces 54 are contoured to frictionally engage the foundation when the shank 30 is received in an opening or recess formed in the foundation, such as the recesses 20 formed in a concrete slab 16 as shown and described above. In the embodiment shown, the foundation engaging surfaces 54 include a plurality of outwardly extending ridges 56 configured to be compressed when installed in a recess 20 in the foundation as depicted in FIGS. 4 and 5, whereby frictional engagement between the ridges 56 and the recess 20 resists withdrawal of the fastener 22 from the recess 20. While the foundation engaging surfaces 54 are shown and described herein as including a plurality of ridges 56, it will be appreciated that the foundation engaging surface may include only a single ridge 56, or may include various other geometric configurations suitable for frictionally engaging the recess 20 formed in a foundation. Moreover, the fastener may include a foundation engaging surface 54 provided on only one of the first or second sides 50, 52 of the shank 30.

In the exemplary embodiment shown and described herein, the shank 30 may further include third and fourth sides 60, 62 disposed between the first and second sides 50, 52. In the embodiment shown, the third and fourth sides 60, 62 of the shank 30 define planar surfaces. In other embodiments, the third and fourth sides 60, 62 may comprise various other geometric configurations. For example, the third and fourth sides 60, 62 may also include foundation engaging surfaces similar to or different from the foundation engaging surfaces 54 depicted herein on the first and second sides 50, 52 of the shank 30.

A fastener 22 in accordance with the present disclosure should be designed and configured to support heavy loads such as those caused by the weight of heavy livestock standing or walking upon the mats 14. Moreover, the fastener 22 should be formed from a material that suitably resists degradation which may be caused by exposure to the environment, cleaning materials used for washing down livestock areas, or other materials that the mats may be exposed to, such as any feed material, for example. In one embodiment, the body 40 and head 32 of the fastener 22 are unitarily formed from a fiber-reinforced polymer material. In one embodiment, the fiber-reinforced polymer material comprises para-aramid synthetic fiber. The polymer material used to form the body 40 and head 32 of the fastener 22 may comprise reclaimed rubber material. In another embodiment, the material forming the body 40 and head 32 of the fastener 22 comprises a natural rubber/styrene-butadiene rubber (NR/SBR) blend. In another embodiment, the fastener 22 is designed and configured such that it is free from any metal components. It will be appreciated, however, that one or more metal components may be incorporated into the structure of the head 32 and/or body 40 of the fastener 22, as may be desired.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A fastener for securing livestock mats to a foundation having at least one recess adapted to direct waste away from a treadable surface of the foundation, the fastener comprising:
   a body comprising fiber-reinforced polymer material, the body including a shank having a first terminal end and an oppositely disposed second end;
   the shank sized and shaped to be received into the recess in the foundation;
   a head at the second end, the head including an outer peripheral edge extending radially outwardly from the shank relative to a longitudinal axis of the shank;

the shank including oppositely disposed first and second sides; and a foundation engaging surface on at least a portion of at least one of the first or second sides, the foundation engaging surface contoured to frictionally engage the foundation when the shank is received therein;

wherein the body, shank, and head are sized and configured such that waste may flow through the at least one recess after the fastener is installed into the at least one recess to secure the mat to the foundation.

2. The fastener of claim 1, wherein the shank further includes oppositely disposed third and fourth sides disposed between the first and second sides.

3. The fastener of claim 2, wherein at least a portion of one of the third or fourth sides defines a planar surface.

4. The fastener of claim 1, wherein both the first and second sides include the foundation engaging surface.

5. The fastener of claim 1, wherein the contour of the foundation engaging surface defines at least one ridge positioned to operatively engage the foundation.

6. The fastener of claim 1, wherein the body and the head are unitarily formed from fiber-reinforced polymer material.

7. The fastener of claim 1, wherein the fiber-reinforced polymer material comprises para-aramid synthetic fiber.

8. The fastener of claim 1, wherein the polymer material comprises reclaimed rubber.

9. The fastener of claim 1, wherein the fastener is free from metal components.

10. A mat assembly for supporting livestock, the mat assembly comprising:

a generally planar mat configured to support livestock thereon;

at least one aperture through the mat;

at least one fastener according to claim 1 and sized to be received though the at least one aperture for securing the mat to a foundation.

11. A method of securing a livestock mat to a foundation, the method comprising:

positioning the livestock mat on the foundation;

aligning an aperture through the mat with a recess defined in the foundation; and inserting a fastener as set forth in claim 1 through the aperture and into the recess, whereby the fastener frictionally engages the recess such that the livestock mat is secured to the foundation and waste may still flow through the recess after the fastener is inserted into the recess.

* * * * *